(12) United States Patent
Kim et al.

(10) Patent No.: US 10,305,395 B2
(45) Date of Patent: May 28, 2019

(54) TRIBOELECTRIC ENERGY HARVESTER USING ELECTROLYTE

(71) Applicant: RESEARCH & BUSINESS FOUNDATION SUNGKYUNKWAN UNIVERSITY, Suwon-si (KR)

(72) Inventors: Sangwoo Kim, Yongin-si (KR); Sungsoo Kwak, Seongnam-si (KR); Seongsu Kim, Seoul (KR); Taeyun Kim, Incheon (KR); Wanchul Seung, Yongin-si (KR); Hanjun Ryu, Daejeon (KR); Hongjoon Yoon, Goyang-si (KR); Jeonghwan Lee, Gumi-si (KR); Juhyuck Lee, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 416 days.

(21) Appl. No.: 15/059,751

(22) Filed: Mar. 3, 2016

(65) Prior Publication Data

US 2016/0261210 A1 Sep. 8, 2016

(30) Foreign Application Priority Data

Mar. 3, 2015 (KR) .................. 10-2015-0029584

(51) Int. Cl.
*H02N 1/04* (2006.01)
(52) U.S. Cl.
CPC .................. *H02N 1/04* (2013.01)
(58) Field of Classification Search
CPC ...................................... H02N 1/04

USPC .................................. 310/309, 310
See application file for complete search history.

(56) References Cited

U.S. PATENT DOCUMENTS

| | | | |
|---|---|---|---|
| 9,887,644 B2* | 2/2018 | Kim | H02N 1/04 |
| 2014/0300248 A1 | 10/2014 | Wang et al. | |
| 2014/0338458 A1 | 11/2014 | Wang et al. | |
| 2016/0165970 A1* | 6/2016 | Jost | H01G 11/24 |
| | | | 219/211 |
| 2016/0218640 A1* | 7/2016 | Wang | H02N 1/04 |

FOREIGN PATENT DOCUMENTS

| KR | 10-2012-0056043 A | 6/2012 |
|---|---|---|
| KR | 10-1411337 B1 | 6/2014 |

OTHER PUBLICATIONS

Lin, Zong-Hong, et al. "Water—Solid Surface Contact Electrification and its Use for Harvesting Liquid-Wave Energy." Angewandte Chemie International Edition 52.48 (2013): pp. 1-6.
Lin, Zong-Hong, et al. "Harvesting Water Drop Energy by a Sequential Contact-Electrification and Electrostatic-Induction Process." Advanced Materials 26.27 (2014): pp. 1-7.

* cited by examiner

*Primary Examiner* — Jeremy A Luks
(74) *Attorney, Agent, or Firm* — NSIP Law

(57) ABSTRACT

Disclosed is a triboelectric energy harvester including an electrolyte solution comprising an electrolyte, and a friction material layer configured to contact the electrolyte solution, wherein the friction material layer is configured to be used as an electrode, and wherein frictional electricity is generated in response to the electrolytic solution contacting the friction material layer.

10 Claims, 10 Drawing Sheets

FIG. 9
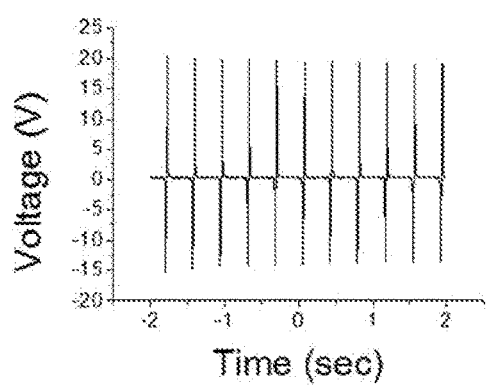 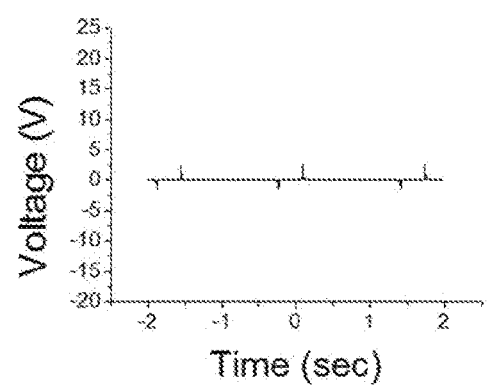

TRIBOELECTRIC ENERGY HARVESTER USING ELECTROLYTE

CROSS-REFERENCE TO RELATED APPLICATION

This application claims the benefit under 35 USC 119(a) of Korean Patent Application No. 10-2015-0029584, filed on Mar. 3, 2015 in the Korean Intellectual Property Office, the disclosure of which is incorporated herein in its entirety by reference.

BACKGROUND

1. Field

The following description relates to method and apparatus for a triboelectric energy harvester capable of generating triboelectricity by using an electrolyte.

2. Description of Related Art

Generally, a triboelectric energy harvester operating on friction is a new type of eco-friendly energy harvesting device that can infinitely extract electrical energy not by using the other existing eco-friendly energies, such as solar energy, wind power and fuel cells, but by using mechanical energy that is generated but wasted in our daily life, such as micro-vibration or human motion. The energy conversion using the triboelectric effect has a superior conversion efficiency while ensuring a compact and lightweight structure, and is recognized as a new technology capable of leading to a great leap in technology through fusion with nanotechnology. The triboelectric energy harvester for harvesting an energy using a static electricity caused by friction generates energy from a difference in electrostatic charges that is caused by contact and separation of two materials.

In the recent years, the triboelectric energy harvester has garnered a large amount of attention, but there is a limitation in which the characteristics of the frictional electricity are specified by the friction material selected based on the triboelectric series. That is, unless a selected friction material is changed into another friction material, the quantity of electric charge induced on one friction material is limited, which causes difficulty in increasing the magnitude of triboelectric energy to be generated.

In order to improve the above constraint, there is provided a development of a triboelectric energy harvester capable of generating a greater triboelectric energy when compared to using the generally known friction material, by using new material other than the materials disclosed in the triboelectric series, and capable of controlling the magnitude of triboelectric energy to be generated.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The following description is directed to a triboelectric energy harvester using an electrolyte, capable of generating a greater triboelectric energy when compared to using the materials disclosed in the existing triboelectric series, and capable of adjusting the triboelectric energy to be generated, by controlling the type and the concentration of the electrolyte.

The following description is not limited to the purposes described above, and other purposes not described above can be understood to the skilled in the art through the description in this disclosure.

According to an aspect of the following description, there is provided a triboelectric energy harvester including an electrolyte solution comprising an electrolyte, and a friction material layer configured to contact the electrolyte solution, wherein the friction material layer is configured to be used as an electrode, and wherein frictional electricity is generated in response to the electrolytic solution contacting the friction material layer.

The triboelectric energy harvester may further include a drawing part electrically connected to the friction material layer and a ground.

The electrolyte includes at least one selected from the group consisting of sodium chloride ($NaCl$), sodium hydroxide ($NaOH$), sodium hydrogen carbonate ($NaHCO_3$), silver nitrate ($AgNO_3$), potassium chloride ($KCl$), potassium carbonate ($K_2CO_3$), sodium carbonate ($Na_2CO_3$), potassium hydroxide ($KOH$), calcium chloride ($CaCl_2$), barium chloride ($BaCl_2$), potassium bromide ($KBr$), calcium hydrogen carbonate ($CaHCO_3$), potassium iodide ($KI$), phosphoric acid ($H_3PO_4$), sulfuric acid ($H_2SO_4$), magnesium hydroxide ($Mg(OH)_2$), and calcium hydroxide ($Ca(OH)_2$).

The electrolyte solution may further include a polymer material.

The polymer material may include at least one selected from the group consisting of polyvinyl alcohol (PVA), polyethylene oxide (PEO), polyphenylene oxide (PPO), polyester, a polyamine and a polysulfide.

The charging characteristics of the friction material layer and the electrolyte solution may be mutually changed according to a concentration of the electrolyte.

The charging characteristics of the friction material layer and the electrolyte solution may be mutually changed according to the type of the electrolyte.

The triboelectric energy harvester may further include an energy storage part connected to the drawing part and to the friction material layer.

The triboelectric energy harvester may include that in response to the electrolyte having weight percents of phosphoric acid $H_3PO_4$, 0 wt % and 5 wt %, the initial voltage and the initial current, at an initial state of about −2 seconds, have negative values, and in response to the electrolyte weight percents of $H_3PO_4$, 10 wt % and 20 wt %, the initial voltage and the initial current have positive values.

The triboelectric energy harvester may include that in response to each of the electrolyte and the polymer material having a weight percent of 10 wt % and the electrolyte is sulfuric acid $H_2SO_4$, a positive voltage of about 1.4V and a positive current of about 0.15 µA are measured.

The triboelectric energy harvester may include that in response to the electrolyte being phosphoric acid $H_3PO_4$, a positive voltage of about 1.7V and a positive current of about 0.23 µA are measured.

According to another aspect of the following description, there is provided a triboelectric energy including an electrolyte solution comprising an electrolyte, an electrode, and a friction material layer disposed on the electrode and configured to contact the electrolyte solution, wherein frictional electricity is generated in response to the electrolytic solution contacting the friction material layer.

The triboelectric energy harvester may further include a drawing part electrically connected to the electrode and a ground.

The triboelectric energy harvester may further include an energy storage part connected to the drawing part and to the electrode.

According to another aspect of the following description, there is provided a triboelectric energy including an electrolyte layer comprising a polymer material and an electrolyte, and a friction material layer configured to contact the electrolyte solution, wherein each of the frictional material and the electrolyte layer is configured to be used as an electrode, and wherein frictional electricity is generated in response to contact and separation between the frictional material layer and the electrolytic layer being repeated.

The triboelectric energy harvester may further include a drawing part electrically connected to the friction material layer, the electrolyte layer and to ground.

The triboelectric energy harvester may further include an energy storage part connected to the friction material layer and the electrolyte layer.

According to another aspect of the following description, there is provided a triboelectric energy including an electrolyte layer comprising a polymer material and an electrolyte, a first electrode, a friction material layer disposed on the first electrode and configured to contact the electrolyte, and a second electrode formed on the electrolyte layer, wherein frictional electricity is generated in response to contact and separation between the frictional material layer and the electrolytic layer being repeated.

The triboelectric energy harvester may further include a drawing part electrically connected to the first electrode, the second electrode, and to ground.

The triboelectric energy harvester may further include an energy storage part connected to the drawing part.

Other features and aspects will be apparent from the following detailed description, the drawings, and the claims.

BRIEF DESCRIPTION OF THE DRAWINGS

The above and other objects, features and advantages of the following description will become more apparent to those of ordinary skill in the art by describing in detail exemplary embodiments thereof with reference to the accompanying drawings, in which:

FIG. 9 is graphs obtained by measuring voltages generated from a triboelectric energy harvester using an electrolyte in accordance with an example embodiment and a triboelectric energy harvester using a material disclosed in the existing triboelectric series.

DETAILED DESCRIPTION

Figure 1:
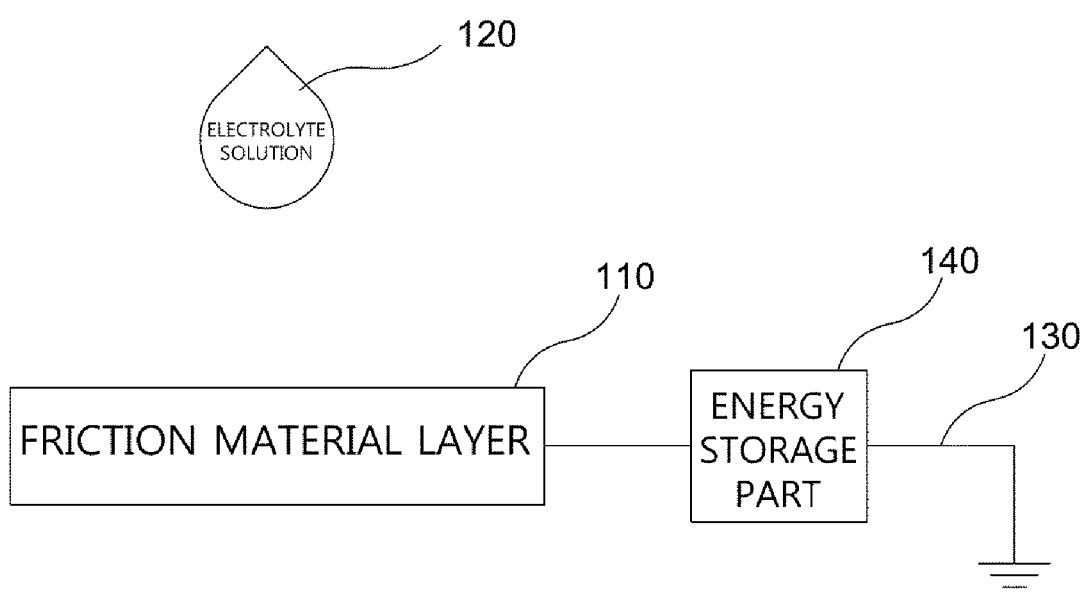
FIG. 1 is a concept diagram illustrating a triboelectric energy harvester using an electrolyte in accordance with an example embodiment.

The following detailed description is provided to assist the reader in gaining a comprehensive understanding of the methods, apparatuses, and/or systems described herein. However, after an understanding of the disclosure, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that may be well known to one of ordinary skill in the art may be omitted for increased clarity and conciseness.

Hereinafter, example embodiments of the following description will be described in detail with reference to the accompanying drawings. The same reference numerals are used to designate the same elements throughout the drawings.

FIG. 1 is a concept diagram illustrating a triboelectric energy harvester using an electrolyte in accordance with an example embodiment.

Referring to FIG. 1, a triboelectric energy harvester 1000 using an electrolyte in accordance with an example embodiment includes a friction material layer 110, an electrolyte solution 120, a drawing part 130 and an energy storage part 140.

The friction material layer 110 is a layer composed of friction material, for example, Teflon. The friction material may be selected from the generally known triboelectric series. The selected friction material is a material that may be charged with a polarity opposite to that of an electrolyte solution 120 when the friction material layer 110 is in contact with the electrolyte solution 120. The friction material may be varied according to the charging characteristics of the electrolyte solution 120. In addition, when the friction material layer 110 has electrical conductivity, the friction material layer 110 may be used as an electrode.

The electrolyte solution 120 may include an electrolyte, and may be manufactured by dissolving an electrolyte into a solvent, such as water. For example, the electrolyte may include at least one selected from the group consisting of sodium chloride (NaCl), sodium hydroxide (NaOH), sodium hydrogen carbonate ($NaHCO_3$), silver nitrate ($AgNO_3$), potassium chloride (KCl), potassium carbonate ($K_2CO_3$), sodium carbonate ($Na_2CO_3$), potassium hydroxide (KOH), calcium chloride ($CaCl_2$), barium chloride ($BaCl_2$), potassium bromide (KBr), calcium hydrogen carbonate ($CaHCO_3$), potassium iodide (KI), phosphoric acid ($H_3PO_4$), sulfuric acid ($H_2SO_4$), magnesium hydroxide (Mg($OH)_2$), and calcium hydroxide ($Ca(OH)_2$).

The electrolyte solution 120 may be dropped onto the friction material layer 110. For example, the electrolyte solution 120 may be dropped onto the friction material layer 110 by using a dropper (Spoid), such that the electrolyte solution 120 in the form of droplets contacts the friction material layer 110. At the moment that the electrolyte solution 120 comes into contact with the friction material layer 110, the electrolyte solution 120 and the friction material layer 110 may be charged with opposite polarities to each other. It should be noted that in order to resolve the imbalance in charges, a transfer of charges occurs between the electrolyte solution 120 and the friction material layer 110. By repeatedly dropping the electrolyte solution 120 onto the friction material layer 11, generation of electrical energy can be continuous.

In addition, the charging characteristics of the friction material layer 110 and the electrolyte solution 120 may be changed according to the concentration of the electrolyte in the electrolyte solution 120. In addition, the charging characteristics of the friction material layer 110 and the electrolyte solution 120 may be changed according to the type of the electrolyte in the electrolyte solution 120. The concentration of and type of the electrolyte in the electrolyte solution 120 may be varied in consideration of the type of material constituting the friction material layer 110.

In addition, the electrolyte solution 120 may further include a polymer material, and in this case, the electrolyte solution 120 shown in FIG. 1 may be cured to form a single layer. The polymer material comprises at least one selected from the group consisting of polyvinyl alcohol (PVA), polyethylene oxide (PEO), polyphenylene oxide (PPO), polyester, a polyamine and a polysulfide. Description thereof will be made below with reference to FIG. 3.

The method of curing the electrolyte solution 120 may be achieved by maintaining the electrolyte solution 120 at the room temperature so as to gradually evaporate the solvent, or in the alternative, by heating the electrolyte solution 120 to evaporate the solvent.

The drawing part 130 has one end electrically connected to the friction material layer 110 for transfer of the charges, and the other end grounded. For example, the drawing part 130 may be provided using a wire. One end of the wire is electrically connected to the friction material layer 110 and the other end is grounded. The drawing part 130 may be provided using various materials as long as it allows the transfer of charges.

In addition, the energy storage part 140 may be connected to the drawing part 130 and configured to store the electrical energy generated by the transfer of charges. The energy storage part 140 may be provided using a general storage battery. In addition, a load connected to the drawing part 130 may be provided with an electrical energy from the general storage battery for operating the load.

Figure 2:
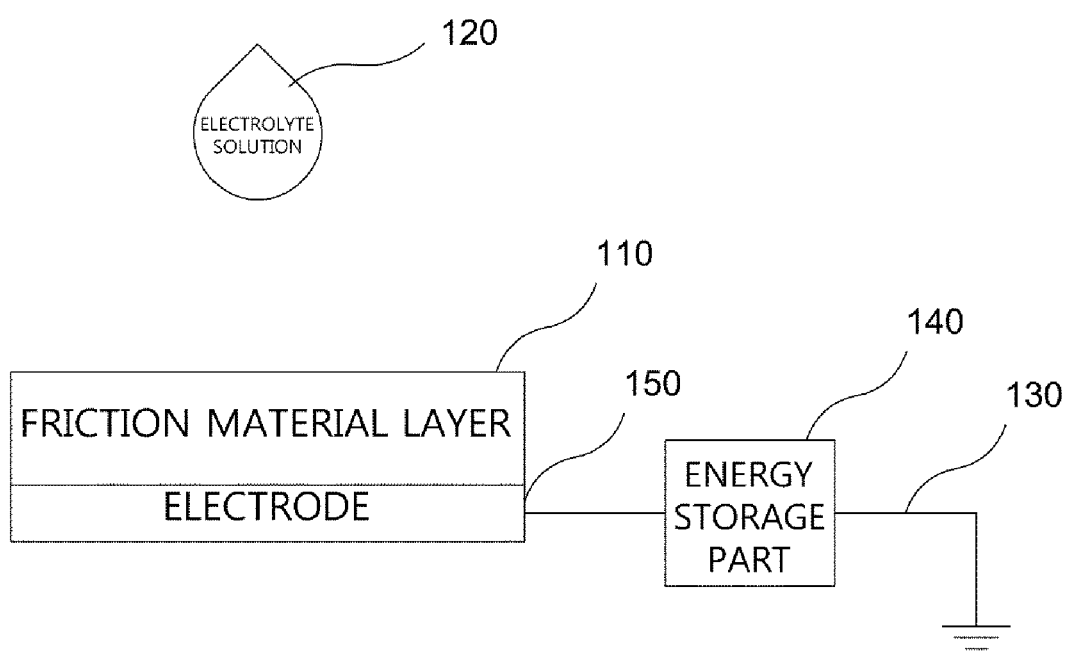
FIG. 2 is a concept diagram illustrating a triboelectric energy harvester using an electrolyte in accordance with an example embodiment.

FIG. 2 is a concept diagram illustrating a triboelectric energy harvester using an electrolyte in accordance with an example embodiment.

Referring to FIG. 2, a triboelectric energy harvester 2000 using an electrolyte in accordance with an example embodiment includes an electrode 150, a friction material layer 110, an electrolyte solution 120, a drawing part 130 and an energy storage part 140. The triboelectric energy harvester 2000 is provided by adding the electrode 150 to the triboelectric energy harvester 1000 described with reference to FIG. 1, and has the same components as those of the triboelectric energy harvester 1000. However, the electrode 150 is disposed below the friction material layer 110 and the drawing part 210 is electrically connected to the electrode 150.

The details of the drawing part 210 may is similar to the drawing part 130 of the triboelectric energy harvester 1000 except the drawing part 210 has one end electrically connected to the electrode 150 for transfer of the charges, and the other end grounded. The other details of the friction material layer 110, the electrolyte solution 120, and the energy storage part 140 are described with reference to FIG. 1.

Figure 3:
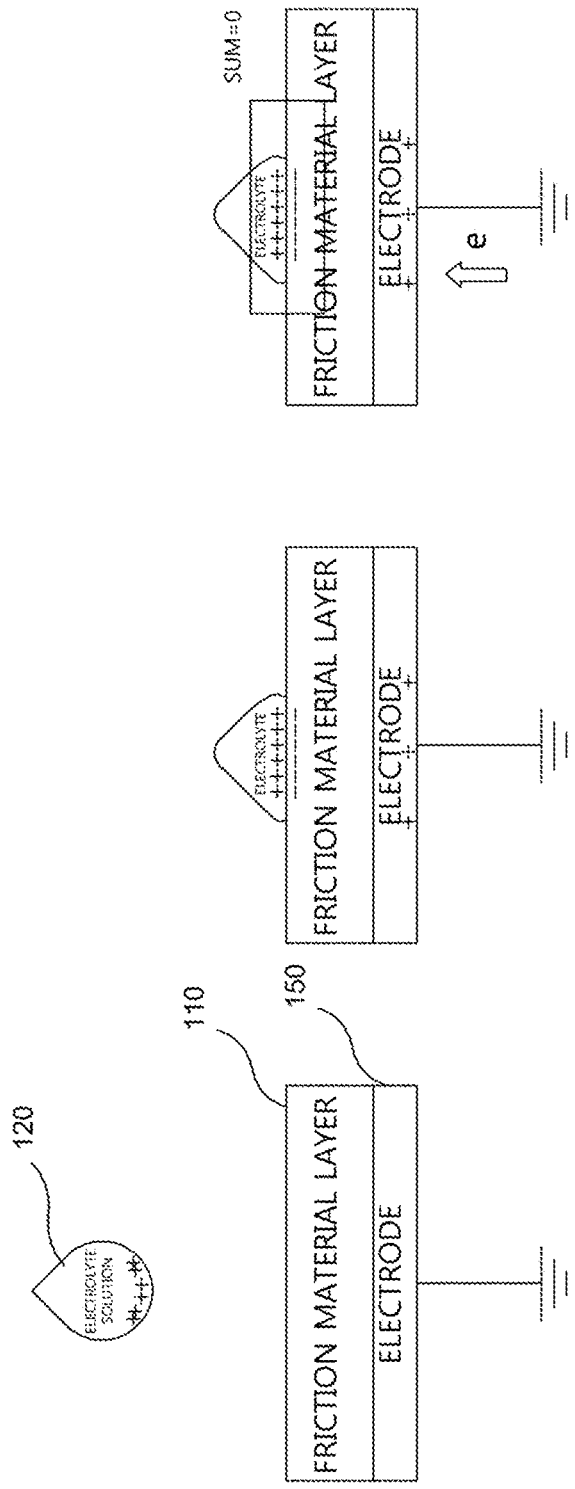
FIG. 3 is a concept diagram illustrating a principle of how an electrical energy is generated in a triboelectric energy harvester using an electrolyte in accordance with an example embodiment.

FIG. 3 is a concept diagram illustrating a principle of how an electrical energy is generated in a triboelectric energy harvester using an electrolyte in accordance with an example embodiment.

Referring to FIG. 3, when the electrolyte solution 120 is dropped on the triboelectric energy harvester 2000, the electrolyte solution 120, for example, raindrops, may be charged positively (+). When the electrolyte solution 120 contacts the friction material layer 110 which is electrically neutral, an interface at a region at which the electrolyte solution 120 contacts the friction material layer 110 is negatively charged (−) to offset the positive charges (+) of the electrolyte solution 120. Accordingly, the electrode 150 is positively charged (+). In order to overcome the charge imbalance of the electrode 150 charged positively (+), negative charges (−) are transferred to the electrode 150, thereby generating an electrical energy.

Figure 4:
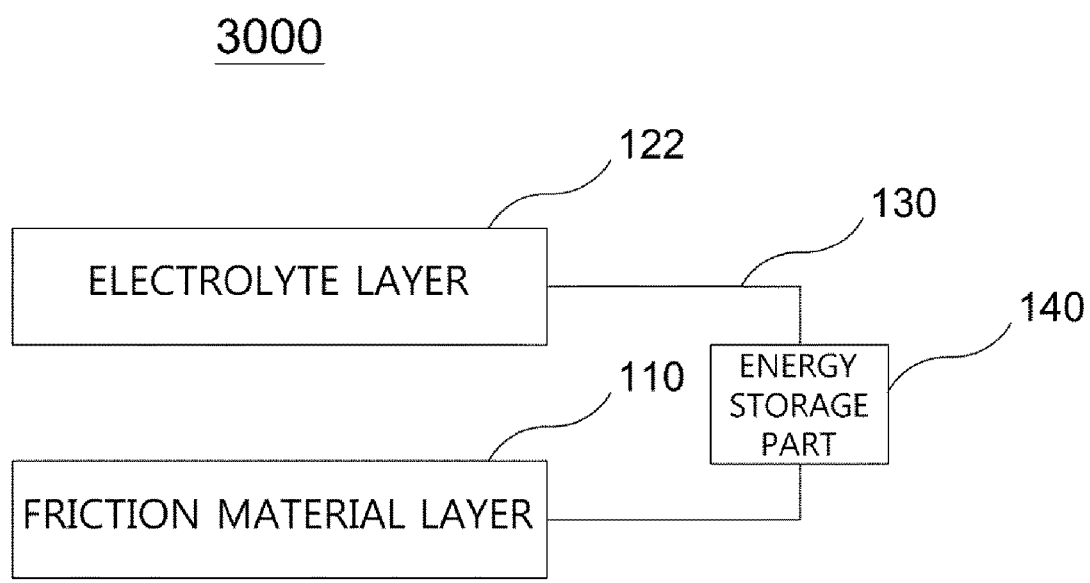
FIG. 4 is a concept diagram illustrating a triboelectric energy harvester using an electrolyte in accordance with an example embodiment.

FIG. 4 is a concept diagram illustrating a triboelectric energy harvester using an electrolyte in accordance with an example embodiment.

Referring to FIG. 4, a triboelectric energy harvester 3000 using an electrolyte in accordance with an example embodiment includes a friction material layer 110, an electrolyte layer 122, a drawing part 220, and an energy storage part 140.

The electrolyte layer 122 may include a polymer material and an electrolyte, and the electrolyte layer 122 may be formed by evaporating a solvent in the electrolyte solution 120 including the polymer material described with reference to FIG. 1. In order to generate electrical energy using the electrolyte solution 120, there is need to continuously drop the electrolyte solution 120, whereas as for the electrolyte layer 122, there is a need to repeat contact and separation of the electrolyte layer 122 and the friction material layer 110 to generate electrical energy.

When each of the electrolyte layer 122 and the friction material layer 110 has electrical conductivity, each of the electrolyte layer 122 and the friction material layer 110 may be used as an electrode.

When the electrolyte layer 122 and the friction material layer 110 contact each other, the electrolyte layer 122 and the friction material layer 110 may be charged with opposite polarities to each other, and a friction material constituting the friction material layer 110 may be selected from the generally known triboelectric series. The friction material may be selected as a material that is charged with a polarity opposite to that of the electrolyte layer 122 upon contact with the electrolyte layer 122, and the friction material may be varied according to a charging characteristic of the electrolyte solution 120. The triboelectric energy harvester 3000 according to the an example embodiment has the same construction as that described above except for using the electrolyte layer 122 that is provided in the form of a solid changed from the electrolyte solution 120 in the form of a liquid.

The details of the drawing part 220 is similar to the drawing part 130 of the triboelectric energy harvester 1000 except the drawing part 220 is electrically connected to the electrolyte layer 122 and the friction material layer 110 for transfer of the charges at one end, and the other end grounded. The other details of the friction material layer 110, and the energy storage part 140 are described with reference to FIG. 4 and FIG. 1.

Figure 5:
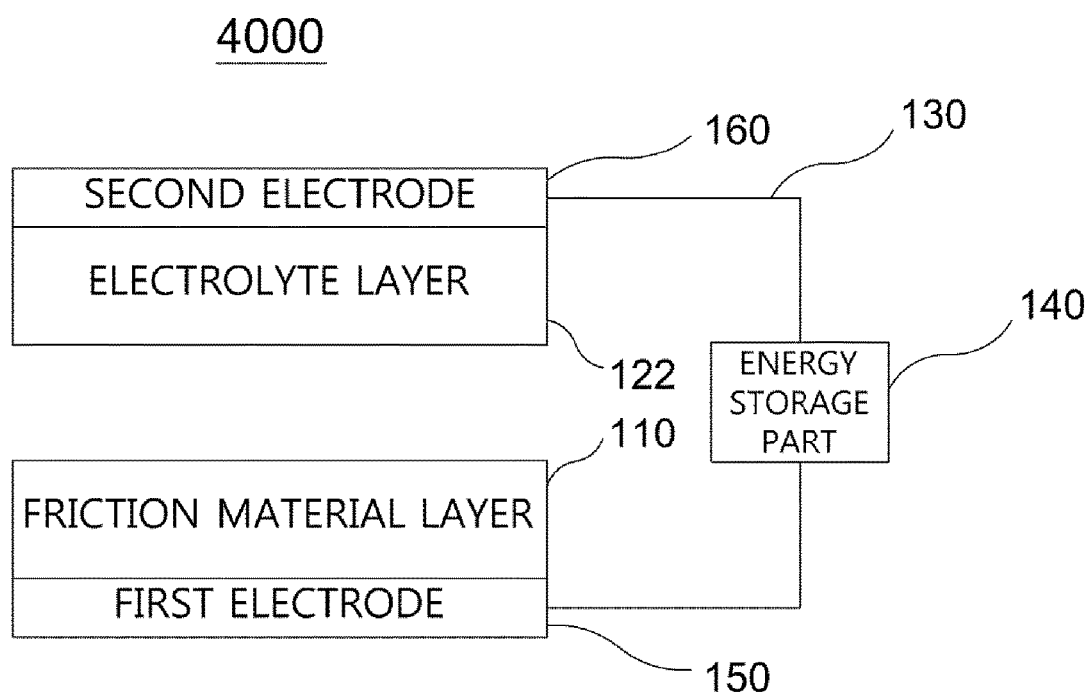
FIG. 5 is a concept diagram illustrating a triboelectric energy harvester using an electrolyte in accordance with an example embodiment.

FIG. 5 is a concept diagram illustrating a triboelectric energy harvester using an electrolyte in accordance with an example embodiment.

Referring to FIG. 5, a triboelectric energy harvester 4000 using an electrolyte in accordance with an example embodiment includes a first electrode 150, a friction material layer 110, an electrolyte layer 122 and a second electrode 160. The triboelectric energy harvester 4000 using an electrolyte in accordance with an example embodiment has the same construction as that described with reference to FIG. 3 except that the friction material layer 110 is disposed on the first electrode 150, the second electrode 160 is disposed on the electrolyte layer 122. Additionally, the first electrode 150 and the second electrode 160 are electrically connected to each other through the drawing part 130.

The details of the drawing part 230 is similar to the drawing part 130 of the triboelectric energy harvester 1000 except the drawing part 230 is electrically connected to first electrode 150 and the second electrode 160 for transfer of the charges at one end, and the other end grounded. The other details of the energy storage part 140 are described with reference to FIG. 1.

Figure 6:
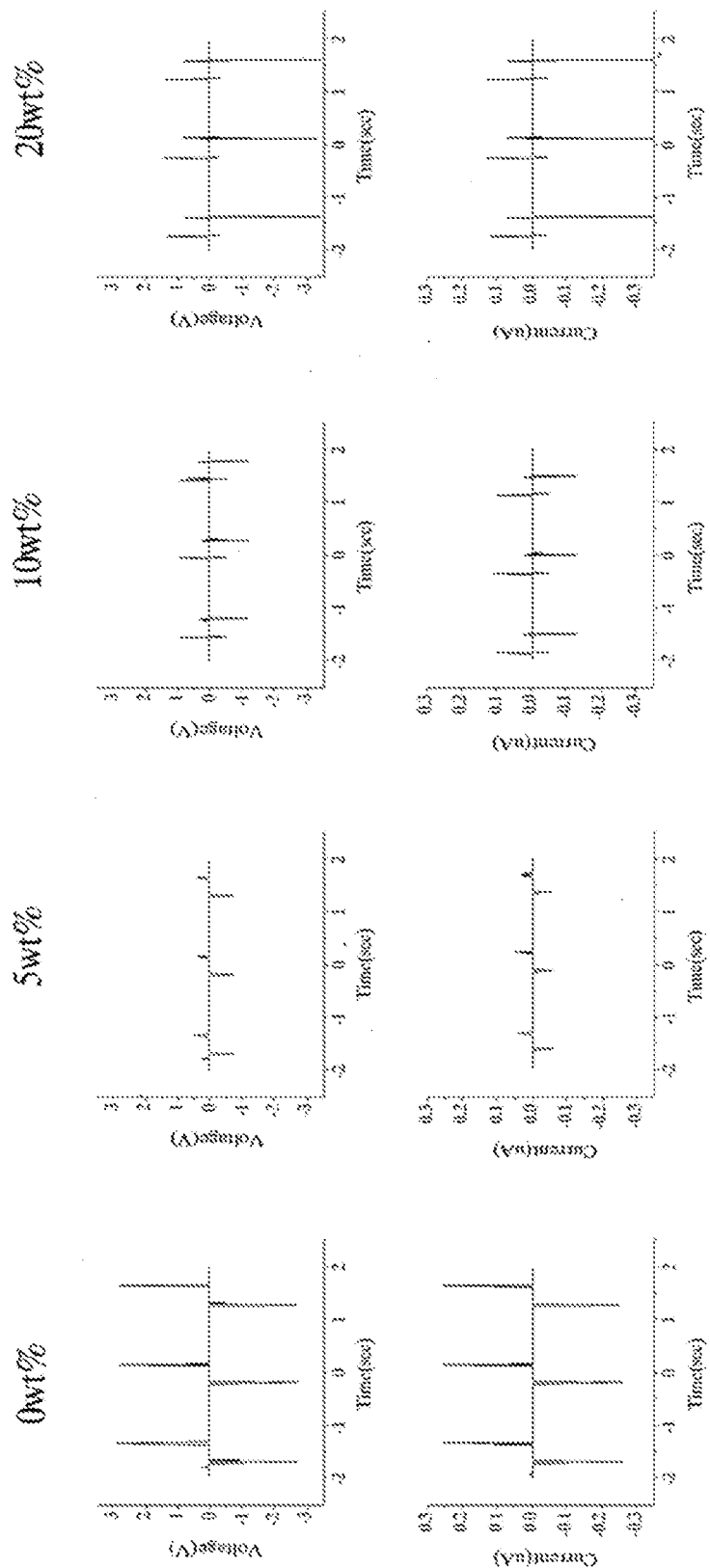
FIG. 6 is a graph showing that charging characteristics of a friction material layer and an electrolyte layer are changed according to the concentration of an electrolyte in a triboelectric energy harvester using an electrolyte in accordance with an example embodiment.

FIG. 6 is a graph showing that charging characteristics of a friction material layer and an electrolyte layer are changed according to the concentration of an electrolyte in a triboelectric energy harvester using an electrolyte in accordance with the above example embodiments. The electrolyte may be implemented using phosphoric acid $H_3PO_4$.

Referring to FIG. 6, when measurements are performed at respective weight percents of phosphoric acid $H_3PO_4$ (0 wt % and 5 wt %), the initial voltage and the initial current (at an initial state of about −2 seconds) have negative values, but at the increased weight percents of $H_3PO_4$ (10 wt % and 20 wt %), the initial voltage and the initial current have positive values. Therefore, the charging characteristics of the friction material layer and the electrolyte layer are changed by changing the concentration of the electrolyte.

Figure 7:
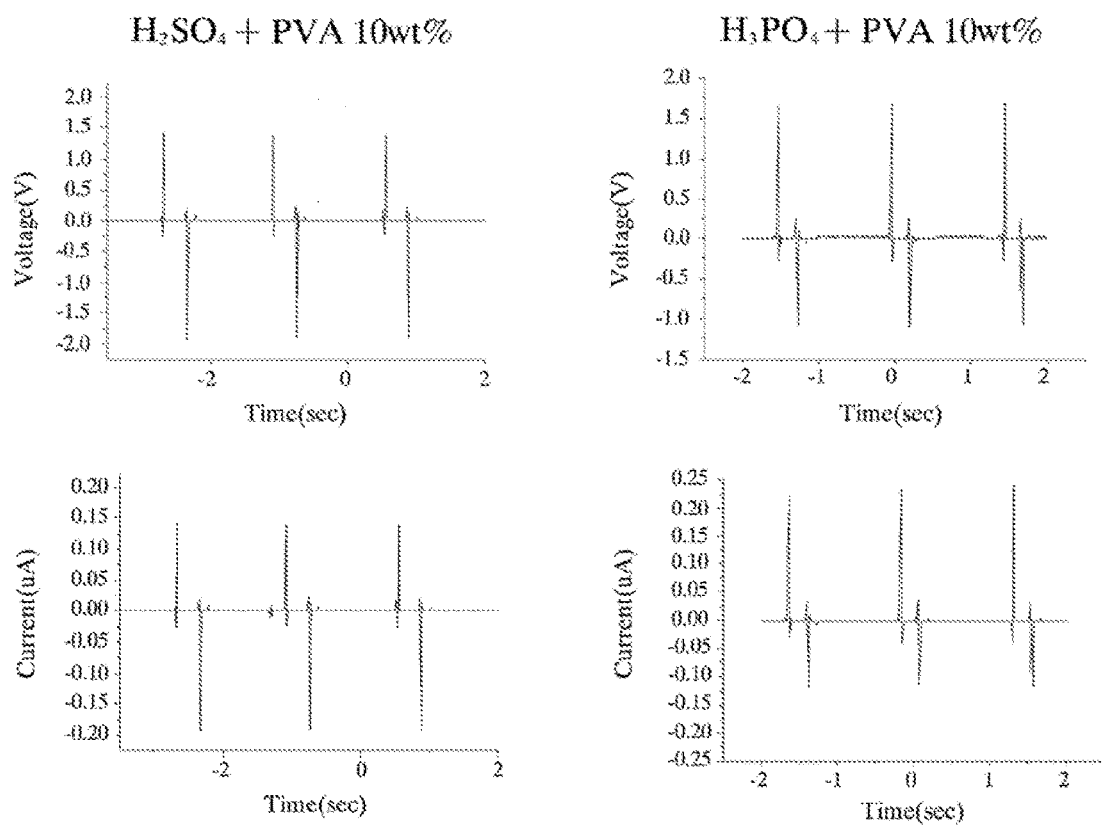
FIG. 7 is a graph showing that the magnitude of frictional electricity to be generated is changed according to the type of an electrolyte in a triboelectric energy harvester using an electrolyte in accordance with an example embodiment.

FIG. 7 is a graph showing that the magnitude of frictional electricity to be generated is changed according to the type of an electrolyte in a triboelectric energy harvester using an electrolyte in accordance with an example embodiment, an experiment of which is performed by using the triboelectric energy harvester 2000 described with reference to FIG. 2.

Referring to FIG. 7, when each of the electrolyte and the polymer material has a weight percent of 10 wt % and the electrolyte is sulfuric acid $H_2SO_4$, a positive voltage of about 1.4V and a positive current of about 0.15 μA are measured. When the electrolyte is phosphoric acid $H_3PO_4$, a positive voltage of about 1.7V and a positive current of about 0.23 μA are measured. Therefore, the magnitude of electrical energy to be generated may be changed by changing the type of an electrolyte.

Figure 8:
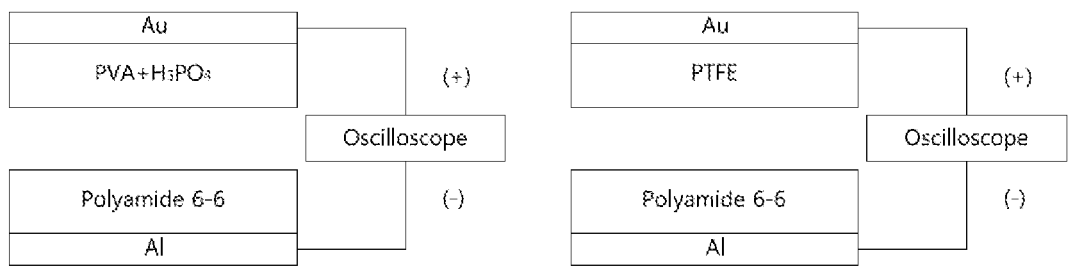
FIG. 8 is a drawing illustrating a triboelectric energy harvester using an electrolyte in accordance with an example embodiment and a triboelectric energy harvester using a material disclosed in the existing triboelectric series.

FIG. 8 is a drawing illustrating a triboelectric energy harvester using an electrolyte in accordance with an example embodiment and a triboelectric energy harvester using a material disclosed in the existing triboelectric series. The left side of FIG. 8 shows a triboelectric energy harvester using an electrolyte in accordance with the above example embodiments, and the right side of FIG. 8 shows a triboelectric energy harvester using a material disclosed in the existing triboelectric series.

Referring to FIG. 8, according to the triboelectric energy harvester using an electrolyte in accordance with the above example embodiments (experimental example), a friction material layer composed of polyamide 6-6 is disposed on an electrode composed of gold (Au). In addition, an electrolyte layer composed of a polymer and an electrolyte (phosphoric acid $H_3PO_4$) is disposed above the friction material layer, and an electrode composed of aluminum (Al) is disposed on the electrolyte layer. Oscilloscope 800 may be used to measure the positive (+) and negative (−) charge of the triboelectric energy harvester using an electrolyte in accordance with the above example embodiments.

The triboelectric energy harvester using a material disclosed in the existing triboelectric series (a comparison example) has the same construction as the experimental example except that the electrolyte layer is replaced with a friction material layer composed of Teflon (polytetrafluoroethylene (PTFE)). Teflon (PTFE) is a material having the largest negative polarity in the triboelectric series. Oscilloscope 810 may be used to measure the positive (+) and negative (−) charge of the triboelectric energy harvester using a material disclosed in the existing triboelectric series.

FIG. 9 is graphs obtained by measuring voltages generated from a triboelectric energy harvester using an electrolyte in accordance with the above example embodiments and a triboelectric energy harvester using a material disclosed in the existing triboelectric series. The graph shown on the left side of FIG. 9 measures a voltage of the experimental example, and the graph shown on the right side of FIG. 9 measures a voltage of the comparison example.

Referring to FIG. 9, the magnitude of a voltage of the experimental example is significantly greater than that of a voltage of the comparison example. That is, the electrolyte layer including phosphoric acid $H_3PO_4$ has a negative polarity greater than using the Teflon (PTFE), which has the largest negative polarity in the triboelectric series. Accordingly, it is proved that the triboelectric energy harvester using an electrolyte in accordance with example embodiments generate frictional electricity that is significantly greater than that generated using material disclosed in the triboelectric series, by using the electrolyte.

Figure 10:
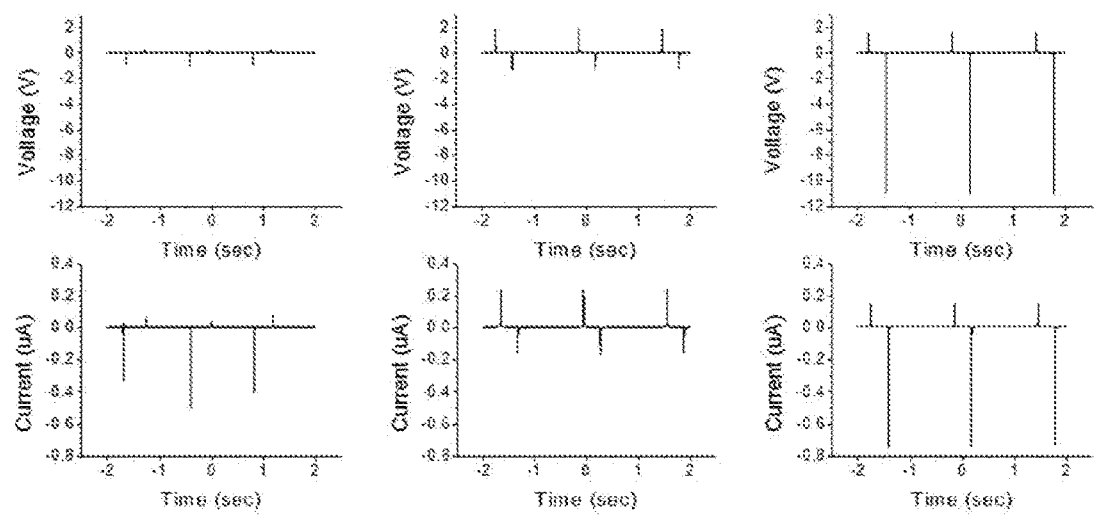
FIG. 10 is a graph obtained by measuring voltages and currents generated from a triboelectric energy harvester using an electrolyte in accordance with an example embodiment and a triboelectric energy harvester using a material disclosed in the existing triboelectric series.

FIG. 10 is a graph obtained by measuring voltages and currents generated from a triboelectric energy harvester using an electrolyte in accordance with the above example embodiments and a triboelectric energy harvester using a material disclosed in the existing triboelectric series.

The triboelectric energy harvester using a material disclosed in the existing triboelectric series is manufactured by replacing the PTFE and the polyamide 6-6 of the structure shown in the right side of FIG. 8 with nylon and PVA, respectively.

In addition, the triboelectric energy harvester using an electrolyte in accordance with the above example embodiments is manufactured by replacing the PTFE and the polyamide 6-6 of the structure shown in the right side of FIG. 8 with nylon and an electrolyte layer, including PVA and an electrolyte (sodium chloride $NaCl_2$), respectively, in which the measurements are performed at electrolyte molarities of 0.5 mol and 1 mol.

Referring to FIG. 10, the graph shown on the left side of FIG. 10 measures a voltage and a current of the triboelectric energy harvester using a material disclosed in the existing triboelectric series, that is, using PVA and nylon. The graphs shown on the middle and right side of FIG. 10 measure, with the electrolyte molarities at 0.5 mol and 1 mol, respectively, a voltage and a current of the triboelectric energy harvester in accordance with the above example embodiment.

As for the triboelectric energy harvester using PVA and nylon, the first voltage peak and the first current peak appearing at around −1.7 seconds have negative values. Meanwhile, as for the triboelectric energy harvester using nylon and the electrolyte layer including PVA and an electrolyte (sodium chloride $NaCl_2$), the first voltage peak and the first current peak at around −1.7 seconds have positive values. That is, by including the electrolyte and PVA, the electrolyte layer provides a further positive polarity than using nylon, which has the largest positive polarity on the existing triboelectric series. Accordingly, it is proved that the triboelectric energy harvester using an electrolyte generates a triboelectric energy that is significantly greater than that generated using the material disclosed in the existing triboelectric series, by using the electrolyte. In addition, as the concentration of electrolyte is higher, the voltage and current generated are increased. Accordingly, the magnitude of triboelectric energy being generated is adjusted by adjusting the concentration of electrolyte.

As is apparent from the above, a greater triboelectric energy can be generated when compared to using the materials disclosed in the existing triboelectric series.

In addition, charging characteristics of a friction material layer and an electrolyte solution or electrolyte layer including an electrolyte can be changed by controlling the type and the concentration of the electrolyte.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A triboelectric energy harvester comprising:
   an electrolyte solution comprising an electrolyte and;
   a friction material layer configured to contact the electrolyte solution,
   wherein the friction material layer is configured to be used as an electrode,
   wherein frictional electricity is generated in response to the electrolytic solution contacting the friction material layer, and
   wherein charging characteristics of the friction material layer and the electrolyte solution are mutually changed by controlling a concentration of the electrolyte.

2. The triboelectric energy harvester of claim 1, further comprising a drawing part electrically connected to the friction material layer and a ground.

3. The triboelectric energy harvester of claim 1, wherein the electrolyte comprises at least one selected from the group consisting of sodium chloride (NaCl), sodium hydroxide (NaOH), sodium hydrogen carbonate ($NaHCO_3$), silver nitrate ($AgNO_3$), potassium chloride (KCl), potassium carbonate ($K_2CO_3$), sodium carbonate ($Na_2CO_3$), potassium hydroxide (KOH), calcium chloride ($CaCl_2$)), barium chloride ($BaCl_2$), potassium bromide (KBr), calcium hydrogen carbonate ($CaHCO_3$), potassium iodide (KI), phosphoric acid ($H_3PO_4$), sulfuric acid ($H_2SO_4$), magnesium hydroxide ($Mg(OH)_2$), and calcium hydroxide ($Ca(OH)_2$).

4. The triboelectric energy harvester of claim 1, wherein the electrolyte solution further contains a polymer material.

5. The triboelectric energy harvester of claim 4, wherein the polymer material comprises at least one selected from the group consisting of polyvinyl alcohol (PVA), polyethylene oxide (PEO), polyphenylene oxide (PPO), polyester, a polyamine and a polysulfide.

6. The triboelectric energy harvester of claim 1, wherein charging characteristics of the friction material layer and the electrolyte solution are mutually further changed according to a type of the electrolyte.

7. The triboelectric energy harvester of claim 2, further comprising an energy storage part connected to the drawing part and to the friction material layer.

8. The triboelectric energy harvester of claim 1,
   wherein when a weight percentage of phosphoric acid $H_3PO_4$ in the electrolyte solution is 0 wt-% or 5 wt %, an initial voltage and an initial current, at an initial state of about −2 seconds, have negative values, and
   wherein when a weight percentage of phosphoric acid $H_3PO_4$ in the electrolyte solution is 10 wt-% or 20 wt-%, the initial voltage and the initial current have positive values.

9. The triboelectric energy harvester of claim 4,
   wherein when weight percentages of the electrolyte and the polymer material in the electrolyte solution are 10 wt-%, respectively, and the electrolyte is sulfuric acid $H_2SO_4$, a positive voltage of about 1.4V and a positive current of about 0.15 µA are measured.

10. The triboelectric energy harvester of claim 1,
    wherein when the electrolyte is phosphoric acid $H_3PO_4$, a positive voltage of about 1.7V and a positive current of about 0.23 µA are measured.

* * * * *